Patented Dec. 10, 1935

2,024,098

UNITED STATES PATENT OFFICE 2,024,098

INSECTICIDE

Leon C. Heckert, Bristol, Pa., assignor to Röhm & Haas Company, Philadelphia, Pa., a corporation of Delaware No Drawing. Application May 31, 1929, Serial No. 367,626

10 Claims. (Cl. 167—30)

This invention relates to insecticides and refers particularly to a series of organic compounds which are of especial value as quick-acting insecticides.

Heretofore the control of flies, mosquitoes and other insects has been generally accomplished by the use of insect flowers, also called pyrethrum. The active material was brought into contact with the insect in various ways; by heating or burning the flowers and subjecting the insect to the smoke or vapors, by spraying a solution of an extract of the flowers upon the insect, or by dusting the powdered flowers upon the insect. The insects that were reached by the material were, in general, rapidly affected. The investigations of Staudinger and others have shown that the active principle of pyrethrum is an ester of such complicated structure that it probably could not be produced synthetically on an economical basis.

Moreover, the production of a crop, like pyrethrum or insect flowers, is an economic possibility only where there is abundant and cheap labor, since only the flowers, and preferably the unopened flowers, are used. The successful production of a crop of this kind would be undoubtedly prohibitive in countries with a high wage scale.

The demand for an insecticide of rapid action has reached such large proportions as to occasion a considerable increase in the cost of insect flowers, the quantity of which, being a natural product, is limited. Further increase in demand will undoubtedly lead to still higher cost. In addition, the amount of active principle varies in different samples of the flowers, resulting in a considerable variation of the insecticidal activity, the evaluation of which is not easily accomplished. It was deemed desirable, therefore, to provide some pure substance or combination of substances which could be produced synthetically in unlimited quantity from readily available materials, and whose insecticidal strength would be uniform and reliable.

It is an object of this invention to provide a substance or combination of substances which may be vaporized, or, when dissolved or suspended in a suitable liquid, may be sprayed or otherwise vaporized, or, when suspended upon or mixed with a suitable solid, may be dusted in a room or elsewhere in such a manner as to produce a prompt effect in the killing of flies, mosquitoes, or other insects that may be present, although having no appreciable harmful effect upon higher forms of life, such as human beings.

I have found that these desirable properties are shown by a series of organic compounds, all of which contain one or more thiocyanate groups, i. e. which are esters of thiocyanic acid. Generally speaking, I have found that all organic derivatives of thiocyanic acid exert a marked toxic effect upon insects, the effective dose, the speed of action, the solubility, volatility, odor, and other properties varying considerably with the variation of the organic radical combined with the thiocyanate group. Those thiocyanates in which the organic residue contains a so-called negative group, which expression is intended to designate carbonyl groups, an aromatic ring, an unsaturated group, halogens, other thiocyanate groups, nitro groups, hydroxyl groups ether linkages, cyanide groups, acid radicals etc., possess insecticidal properties which are strikingly better than those in which no negative group is present in the organic residue. Phenolic hydroxyl groups are not included in the negative groups listed above since these particular hydroxyl groups are positive.

By proper choice of the organic radical, it is possible to produce insecticides with properties favorable for particular applications. For example: while the organic thiocyanates generally are not soluble in water, the introduction of a hydroxyl, a carboxyl, an amino, or other salt-forming group into the organic radical may permit the formation of water-soluble salts, the solutions of which are effective insecticides. Again, the introduction of aliphatic groups, such as, methyl, ethyl, propyl, iso-propyl, butyl, iso-butyl, amyl, isoamyl, etc., into an aromatic thiocyanate, e. g. the methylation of p-thiocyanoaniline, increases its insecticidal properties and its solubility in kerosene, a preferred solvent, and masks its offensive odor. For example, while kerosene solutions of benzyl thiocyanate of very low concentration are very effective insecticides, the sprayed solution has an offensive odor and is somewhat irritating. The use, however, of p-thiocyano dimethylaniline overcomes these objections very satisfactorily, without detracting from the insecticidal activity. In similar ways, other properties may be varied between wide limits by using suitable organic radicals in combination with the thiocyanate group. In giving these and subsequent concrete examples, I do not limit myself to the specific compounds mentioned, nor to the particular methods described, these being given simply as a means for clearly describing my invention.

I have further found that the insecticidal activity of these compounds is so great that they can be satisfactorily employed in mixtures of considerable dilution, thus allowing their employment in mixtures containing a large proportion of cheaper substances, thereby materially reducing the cost while having increased the ease of application.

Among the compounds suitable for my invention are methyl thiocyanoacetate, amyl-β-thiocyanopropionate, diethyl thiocyanomalonate, ethylene dithiocyanate, benzyl thiocyanate, phenyl thiocyanate, p-thiocyanoaniline, thiocyanotoluidine, p-thiocyanodimethylaniline, thiocyano-α-naphthylamine, thiocyanoanisidine, β-thiocyanoethyl acetate, p-thiocyanophenylmorpholine, 4-thiocyano-α-naphthol, p-thiocyanobenzylaniline, 2-4-dinitrothiocyano benzene, thiocyanoacetophenone and other compounds of a similar nature. These compounds are merely concrete examples of the type that may be employed, and the one or ones employed is determined by the mode of application, the insect to be killed, and other factors.

I have found that, in general, the solubility of these compounds in kerosene and similar solvents decreases as the organic residue becomes more complex. A solution, however, of such sparingly soluble complex substances, which solution is usually not in excess of a 1% solution, is very effective in the extermination of insects.

The following are examples of methods by which this class of compounds may be used as insecticides.

*Example 1*

One part of benzyl thiocyanate is dissolved in 99 parts of kerosene or other suitable liquid. If the resulting solution is sprayed or otherwise vaporized into a space containing flies or other insects, the results obtained are striking, it being commonly possible by this procedure to eliminate the flies practically completely within a very short period, e. g. five minutes, the result being a visible accumulation of dead flies upon the floor.

*Example 2*

One part of p-thiocyanodimethylaniline is dissolved in 99 parts of water containing sufficient acid, e. g. hydrochloric acid, to dissolve it. When this solution is used in the same manner as above described, the extermination of the insects in the closed space is complete.

*Example 3*

Ten parts of p-thiocyanodimethylaniline is deposited upon or mixed with 90 parts of an inert, powdered solid, such as calcium carbonate, talc, kieselguhr, etc. When this powder is blown on or otherwise brought into contact with insects, e. g. roaches, the insects are killed within a short time.

*Example 4*

When methyl thiocyanoacetate, amyl-β-thiocyanopropionate, phenyl thiocyanate, or other volatile thiocyanate is vaporized in a closed space containing insects such as flies, mosquitoes, roaches, etc., the insects are killed within a short time.

The method of applying all other organic thiocyanates is similar to the method set forth in these examples. Generally, where the thiocyanate is dissolved in kerosene or other mineral oil or mixture, the concentration of the solution is not more than 1%. Where the thiocyanate is insoluble in the solvent it is preferable to deposit it upon an inert powdered solid or to convert it into a water-soluble salt by the introduction of salt-forming groups into the organic residue and using the water solution as a spray.

In giving these concrete examples, I do not limit myself to the specific compounds mentioned, nor to the particular insects mentioned, nor to the particular methods of application described, as these are given simply to describe my invention more clearly.

What I claim is:

1. An insecticide comprising p-thiocyanodimethylaniline.

2. An insecticide comprising a solution of p-thiocyanodimethyl aniline.

3. An insecticide comprising a mineral oil and p-thiocyanodimethyl aniline.

4. An insecticide comprising a solution containing not more than 1% of p-thiocyanodimethyl aniline.

5. An insecticide comprising phenyl thiocyanate.

6. An insecticide comprising thiocyano-α-naphthylamine.

7. An insecticide comprising an aromatic thiocyanate the organic residue of which contains a negative substituent selected from the group consisting of a carbonyl group, an aryl radical, an unsaturated organic radical, a nitro group, a halogen, a cyanide group, an alkyl group and an organic radical bound to oxygen as in groups of the type of alkoxy and ester groups.

8. An insecticide comprising one of the group consisting of thiocyanotoluidine, thiocyanoanisidine, p-thiocyanophenylmorpholine, p-thiocyanobenzylaniline, 2-4-dinitrothiocyano benzene, thiocyanoacetophenone p-thiocyano-dimethyl aniline, phenyl thiocyanate and thiocyano-α-naphthyl amine.

9. The process of exterminating insects which comprises treating them with an aromatic thiocyanate, the organic residue of which contains a negative substituent selected from the group consisting of a carbonyl group, an aryl radical, an unsaturated organic radical, a nitro group, a halogen, a cyanide group, an aryl group and an organic radical bound to oxygen as in the groups of the type of alkoxy and ester groups.

10. The process of exterminating insects which comprises treating them with a substance selected from the group consisting of thiocyanotoluidine, thiocyanoanisidine, p-thiocyanophenyl morpholine, p-thiocyanobenzol aniline, 2-4-dinitrothiocyano benzene, thiocyanoacetophenone, p-thiocyanodimethyl aniline, phenylthiocyanate and thiocyanate-α-naphthylamine.

LEON C. HECKERT.